United States Patent
Bättig

[11] Patent Number: 5,803,612
[45] Date of Patent: Sep. 8, 1998

[54] BEARING SUPPORT ARRANGEMENT FOR RAPIDLY ROTATING ROTORS

[75] Inventor: Josef Bättig, Egliswisl, Switzerland

[73] Assignee: Asea Brown Boveri AG, Baden, Switzerland

[21] Appl. No.: 818,981

[22] Filed: Mar. 14, 1997

[30] Foreign Application Priority Data

Apr. 4, 1996 [DE] Germany .................. 196 13 471.4

[51] Int. Cl.⁶ .................................................. F16C 27/04
[52] U.S. Cl. .................................................. 384/99
[58] Field of Search ........................... 384/99, 537, 584, 384/581, 535

[56] References Cited

U.S. PATENT DOCUMENTS

| Re. 31,394 | 9/1983 | Streifert . | |
|---|---|---|---|
| 3,950,964 | 4/1976 | Alexeeva et al. . | |
| 4,337,982 | 7/1982 | Moringiello et al. . | |
| 4,353,604 | 10/1982 | Dulberger et al. . | |
| 4,971,458 | 11/1990 | Carlson . | |
| 5,425,584 | 6/1995 | Ide . | |
| 5,613,781 | 3/1997 | Kuzdzal et al. ........................ | 384/99 |

FOREIGN PATENT DOCUMENTS

| 718715 | 9/1965 | Canada . |
|---|---|---|
| 0143950 | 6/1985 | European Pat. Off. . |
| 2644026 | 4/1977 | Germany . |
| 2628828 | 12/1977 | Germany . |
| 3609618A1 | 10/1986 | Germany . |
| 3531313C3 | 9/1989 | Germany . |
| 3915476A1 | 11/1989 | Germany . |
| 4021325C1 | 1/1992 | Germany . |

Primary Examiner—Lenard A. Footland
Attorney, Agent, or Firm—Burns, Doane, Swecker & Mathis, L.L.P.

[57] ABSTRACT

The object of the invention is to provide an improved bearing support arrangement for rapidly rotating rotors, with which arrangement the service life of the bearing device is increased and both its fabrication costs and the expenditure on assembly are reduced. This is achieved according to the invention in that the bearing support arrangement (10) is of one-piece design. It comprises an outer flange (11) connected to the housing (2), a gimbal ring (12) and an inner bearing bush (13) which receives the bearing or the bearings (3). In each case a circumferential slot (14, 15) is formed both between the gimbal ring (12) and the outer flange (11) and between the gimbal ring (12) and the bearing bush (13). The gimbal ring (12) is respectively connected to the bearing bush (13) and to the outer flange (11) via two inner and two outer webs (16, 17) which interrupt the respective circumferential slot (14, 15). The annular gap (25) is formed between the bearing bush (13) and the housing (2) and is arranged axially offset with respect to the gimbal ring (12). At least one centering surface (22, 23) is arranged both on the outer flange (11) and on the housing (2), the said centering surfaces (22, 23) being arranged so as to correspond to one another and so as to be concentric with respect to the bearing/bearings (3).

10 Claims, 3 Drawing Sheets

BEARING SUPPORT ARRANGEMENT FOR RAPIDLY ROTATING ROTORS

BACKGROUND OF THE INVENTION

1. Field of the Invention

The invention relates to a bearing support arrangement for the radial and axial bearings of rapidly rotating rotors, in particular for the bearing arrangement of turbocharger shafts, comprising components which are arranged between at least one bearing and one bearing flange and are used for radially supporting the bearing or bearings.

2. Discussion of Background

Rapidly rotating rotors, such as the shafts of turbochargers, have acting on them large axial and radial forces which are absorbed by appropriately designed and arranged axial and/or radial bearings. In addition, for troublefree operation both the radial rotor oscillations and possible misaligned positions of the rotor must be compensated.

DE-A 26 28 828 discloses a bearing arrangement for rotating machine parts, in particular for shafts of turbochargers, in which bearing arrangement the axial forces from the compressor side of the turbocharger are absorbed by means of two ballbearings which are in a tandem arrangement. The radial and axial support of these ballbearings is provided in each case by means of packets of damper plates. The arrangement of the damping packets absorbs possible unbalances of the rotor shaft in the bearings.

However, this solution has a nonlinear spring characteristic curve, which results in an undefined spring/damping characteristic. Therefore, under specific operating conditions the bearing forces may become unacceptably high. Moreover, if radial shaft movements occur, there is undesired wear in the axial damper plate packet. The aforesaid disadvantages can thus shorten the service life of the bearing arrangement.

EP-B1-01 43 950 discloses a further bearing device for exhaust gas turbochargers with tandem roller bearings. With this solution, a linear spring characteristic curve can be realized by means of a plurality of cylindrical spring rods arranged over the circumference of the bearings. The bearing device also has two separate damping systems which each bring about damping of the radial oscillations. To this end, the first damping system is designed as a trapped oil damper with a corresponding annular gap. The second damping system is a friction damping device with a damping ring which rests on the outer end face of the outer ring of the roller bearing and is adjoined by a spring plate.

However, in this solution not only do the contact surface of the bearing flange and of the outer ring of the roller bearing wear but also especially the contact points between the spring plate and the damping ring because it is especially at that point that the axial load of the rotor is transmitted to the bearing support arrangement. As a result, the damping in the radial direction is no longer adequately ensured, which can lead to increasing loading of the bearings as far as the failure of the turbocharger. Moreover, the bearing device comprises a plurality of components which have to be fabricated very precisely. As a result of this, on the one hand, relatively high fabrication costs are incurred and, on the other hand, time-consuming assembly of the bearing device is necessary.

Both solutions have the common disadvantage that they can compensate either only very small misaligned shaft positions, or none at all.

SUMMARY OF THE INVENTION

Accordingly, one object of the invention is to provide a novel way of avoiding these disadvantages and providing an improved bearing support arrangement for rapidly rotating rotors, with which arrangement the service life of the bearing device is increased and both its fabrication costs and the expenditure on assembly are reduced.

This is achieved according to the invention in that, in an apparatus according to the preamble of claim 1, the bearing support arrangement is designed in one piece. Said arrangement comprises an outer flange connected to the housing, a gimbal ring and an inner bearing bush which receives the bearing or bearings. In each case a circumferential slot is formed both between the gimbal ring and the outer flange and between the gimbal ring and the bearing bush. The gimbal ring is respectively connected to the bearing bush and to the outer flange via two inner and two outer webs which interrupt the respective circumferential slot. The annular gap of the trapped oil damper is formed between the bearing bush and the housing and is arranged axially offset with respect to the gimbal ring. In each case one centering surface is formed on the outer flange and on the housing. The centering surfaces correspond to one another and are arranged concentrically with respect to the bearing or bearings.

The advantages of the invention arise especially from the fact that the bearing support arrangement is designed in one piece. As a result, no friction can be produced between the individual elements, so that the bearing support arrangement is completely wear-free. Moreover, the bearing arrangement, or more precisely the gimbal ring, has a linear spring characteristic curve, i.e. a precisely defined spring stiffness. Consequently, the bearing forces which occur can be predetermined, so that the bearing arrangement can be configured according to the requirements. In this way, the service life of the arrangement can be increased. The one-piece design of the bearing support arrangement enables both the fabrication costs and the assembly times to be substantially reduced.

Lastly, when the rotor is operating, all the forces acting on the bearing arrangement are transmitted to the housing via the bearing support arrangement. The necessary radial and angular compliance of the bearing support arrangement is achieved by means of the gimbal ring. A decisive factor here is that the gimbal ring can execute a radial movement under axial load without producing friction between the various elements of the bearing support arrangement. To this end, the outer flange is permanently connected to the housing and is arranged appropriately centered by means of the centering surfaces. Finally, wear-free damping is also ensured by means of the trapped oil damper arranged according to the invention.

It is particularly expedient if the inner webs are arranged offset with respect to one another by 180° and the outer webs by in each case 90° with respect to the inner webs. As a result, the gimbal ring has very good compliance in the radial direction and very low stiffness. Consequently, under corresponding loading it can be deformed in the radial direction to a maximum extent without losing its elasticity.

In addition, it is advantageous if the bearing bush comprises a first bush part which is connected to the gimbal ring or the outer flange via the webs and a second bush part which extends axially with respect thereto, the annular gap being formed between the second bush part and the housing. As a result, the trapped oil damper, whose annular gap always has to be arranged between an oscillating component and a static component, can be realized in a relatively simple way.

The gimbal ring is of constant thickness over its entire circumference. This ensures relatively easy fabrication accompanied by a satisfactory effect. Alternatively, the thickness of the gimbal ring is increased in the region of the webs. In this way, the stresses occurring in this region can be optimized.

In a first refinement of the invention, the bearings are arranged radially underneath the trapped oil damper, and in a second refinement they are placed directly underneath the gimbal ring. Both variants provide different possible ways of assembly, the first refinement being used especially if the damping forces are greater than the spring forces. On the other hand, with the opposite distribution of forces the second refinement is used.

The oil supply for the annular gap of the trapped oil damper comprises a connection for oil under pressure and a connecting hole which are both arranged in the housing. This solution is suitable in particular for applications with adequate physical space; advantageously no additional holes or seals are necessary. When there is a lack of radial space, i.e. if the housing is not accessible, the connecting hole may be arranged only in the housing and the connection for oil under pressure may be arranged in the outer flange.

Finally, the outer flange is connected to the housing in an easily detachable way. This permits the working time necessary for replacing the bearing or bearings to be reduced further.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein two exemplary embodiments of the invention are illustrated with reference to the compressor-side bearing support arrangement for the axial/radial bearings of an exhaust gas turbocharger which are designed in a tandem arrangement, in which drawings.

Only the elements essential for understanding the invention are shown. The compressor-side and the turbine-side of the exhaust gas turbocharger, for example, of the apparatus are not illustrated.

DESCRIPTION OF THE PREFERRED EMBODIMENTS

Referring now to the drawings, wherein like reference numerals designate identical or corresponding parts throughout the several views, the exhaust gas turbocharger essentially comprises a rotor with a compressor wheel, a turbine wheel and a common shaft 1 as well as a compressor housing, a turbine housing and in each case a compressor-side or a turbine-side housing 2 which is designed as a bearing housing. The bearing arrangement of the shaft 1 has, on the compressor side, two axial/radial bearings 3 which are designed as ballbearings in a tandem arrangement and each comprise an outer ring 4, a cage 5, an inner ring 6 and a number of balls 7.

Figure 1:
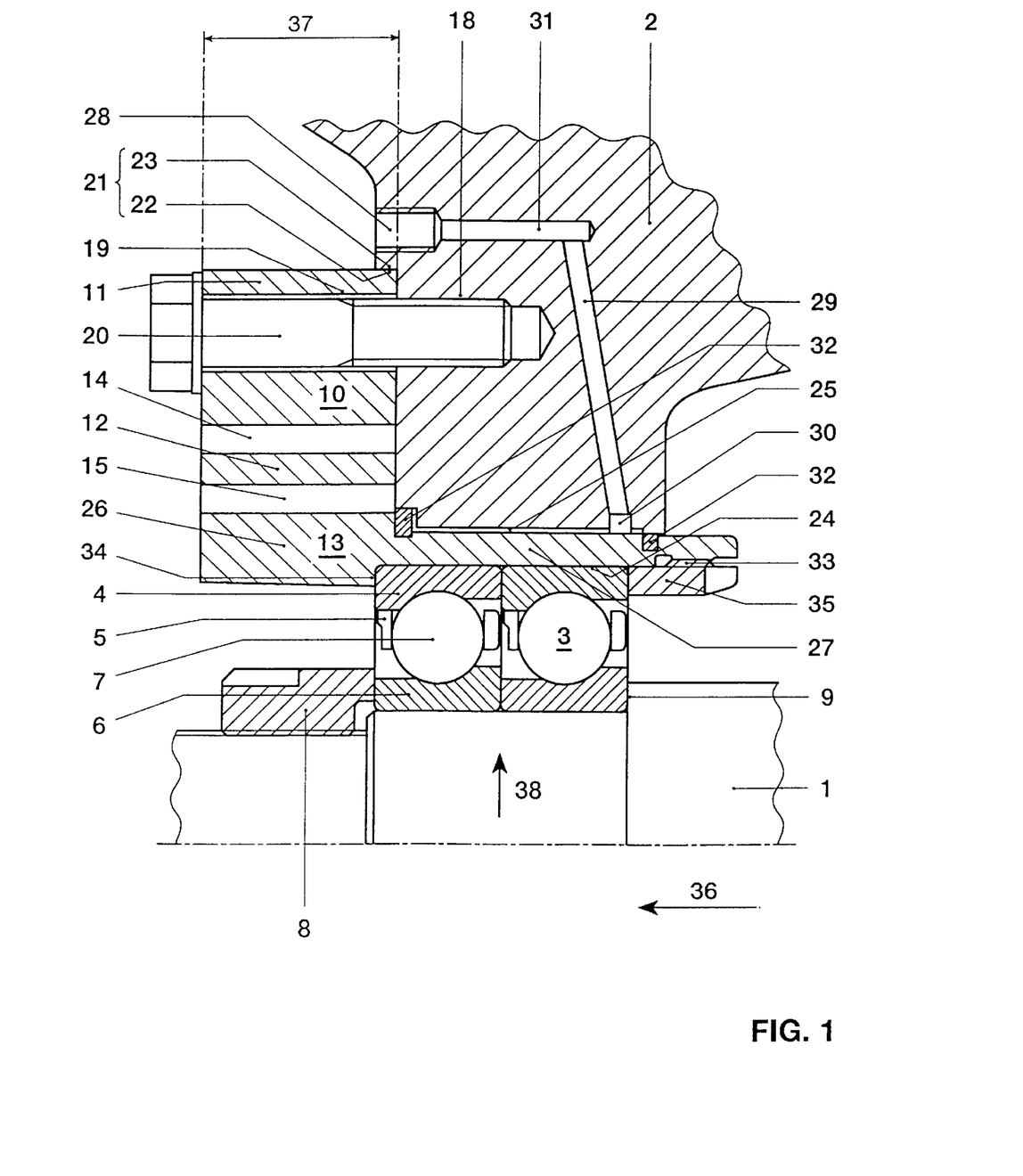
FIG. 1 shows a partial longitudinal section of an exhaust gas turbocharger in the region of the bearing support arrangement.

The two ballbearings 3 are attached to the shaft 1 by means of a nut 8 which presses them against a shaft collar 9. A one-piece bearing support arrangement 10 is arranged between the bearing housing 2 and the ballbearings 3. Said bearing support arrangement 10 comprises an outer flange 11 connected to the bearing housing 2, a gimbal ring 12 and an inner bearing bush 13 which receives the ballbearings 3. In each case a circumferential slot 14, 15 is formed either between the gimbal ring 12 and the outer flange 11 or between the gimbal ring 12 and the bearing bush 13 (FIG. 1). The gimbal ring 12 is respectively connected to the bearing bush 13 and to the outer flange 11 via two inner and two outer webs 16, 17 which interrupt the respective circumferential slot 14, 15. In this arrangement, the two inner webs 16 of the gimbal ring 12 are offset with respect to one another by 180°, and the outer webs 17 are offset by 90° with respect to the inner webs 16.

Figure 2:
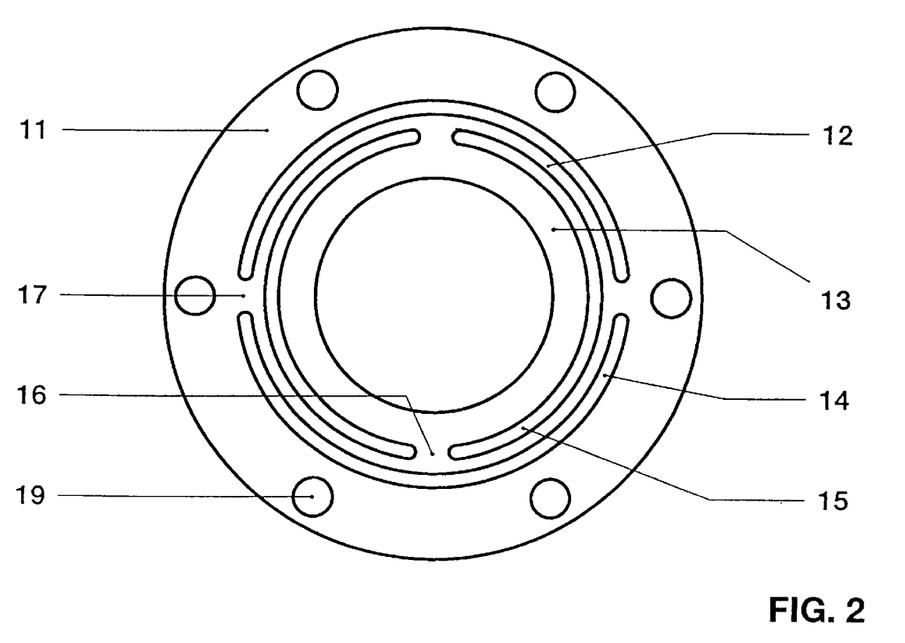
FIG. 2 shows a front view of the bearing support arrangement corresponding to FIG. 1, illustrated in reduced form.
Figure 3:
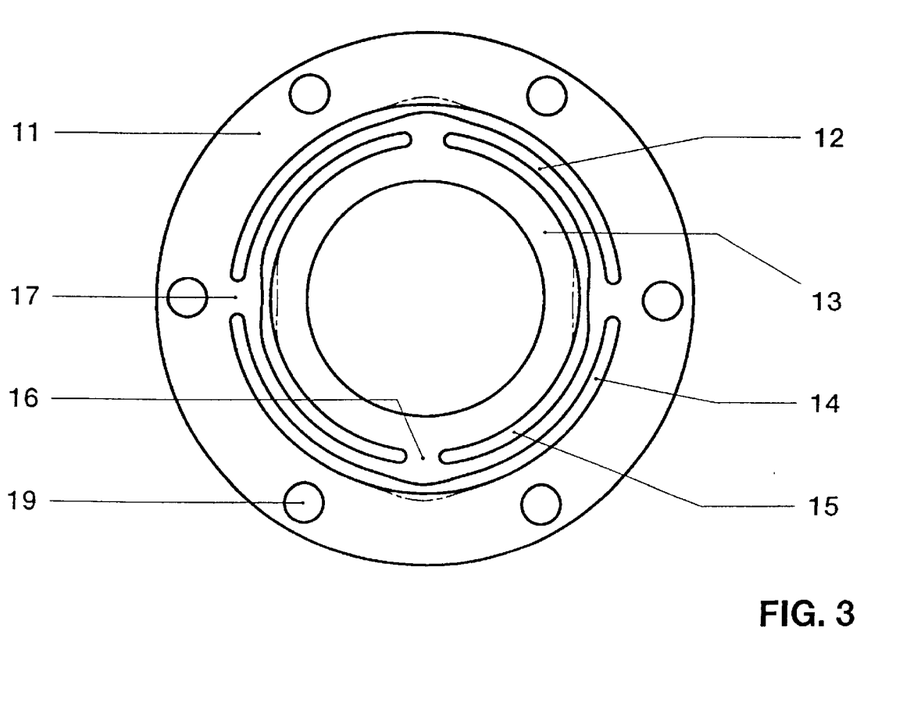
FIG. 3 shows an illustration corresponding to FIG. 2, in a slightly modified form.

The gimbal ring 12 is of a constant thickness over its circumference, and the circumferential slots 14, 15 are of a constant slot width (FIG. 2). Alternatively, the thickness of the gimbal ring 12 is increased in the region of the webs 16, 17, and the circumferential slots 14, 15 are of reduced slot width in this region (FIG. 3). For reasons of manufacture, the slots 14, 15 can also be realized in a constant form (illustrated by broken lines) or enlarged in the region of the webs 16, 17 (not shown).

Threaded holes 18 and attachment holes 19, which correspond to one another in the mounted state, are respectively formed both in the bearing housing 2 and in the outer flange 11 of the bearing support arrangement 10. The bearing support arrangement 10 is attached in the region of its outer flange 11 to the bearing housing 2 by means of a plurality of screws 20 guided in the holes 18, 19, and it is centered by means of a cylindrical fit 21. To this end, the fit 21 has in each case a centering surface 22 formed on the outer flange 11 and a centering surface 23 formed on the bearing housing 2. Both centering surfaces 22, 23 are arranged concentrically with respect to an outer surface 24 of the ballbearings 3 (FIG. 1).

A trapped oil damper 25 which is designed as an annular gap is arranged between the bearing bush 13 and the bearing housing 2, and is axially offset with respect to the gimbal ring 12. To this end, the bearing bush 13 comprises a first bush part 26, respectively connected to the gimbal ring 12 and to the outer flange 11 via the webs 16, 17, and an axially extending, second bush part 27, the annular gap 25 being formed between the second bush part 27 and the bearing housing 2. Arranged in the bearing housing 2 is an oil feeding system 31 comprising a connection 28 for oil under pressure, a connecting hole 29 and an annular passage 30, the annular passage 30 being formed in the axially outer region of the annular gap 25. The latter is connected to the annular passage 30 and is sealed off from the outside on both sides with a piston ring 32.

The dimensions of the annular gap 25, i.e. its width and height, result from the damping properties necessary for the bearing support arrangement 10. Of course, the connection 28 for oil under pressure can also be arranged in the outer flange 11 of the bearing support arrangement 10. The sealing of the annular gap 25 from the outside can also be effected with only one piston ring 32. Of course, O rings are also suitable as an alternative.

Depending on the concrete operating conditions, the type and/or the number of bearings 3 used can differ. For example, the use of only one or else of three bearings 3 is possible, it being possible for them to be designed as simple ballbearings or roller bearings, but also as sliding bearings. Moreover, such a bearing support arrangement 10 can also be used in the turbine-side bearing arrangement (not illustrated) of the shaft 1.

In a first exemplary embodiment of the invention, the ballbearings 3 are arranged radially underneath the trapped oil damper 25. To this end, the second bush part 27 is formed radially between the bearing housing 2 and the ballbearings 3. It has a smaller inner diameter than the first bush part 26 and bears an internal thread 33 in the region of its turbine-side end. The first bush part 26 has an axial shoulder 34 against which the ballbearings 3 are pressed by a nut 35 which is screwed to the internal thread 33 of the second bush part 27. In this arrangement, a positively engaging connection, which does not permit any relative movement between the two components, is produced between the bearing support arrangement 10 and the ballbearings 3.

When the exhaust gas turbocharger is operating, the axial forces 36 which occur are thus conducted in a positively engaging way from the shaft collar 9 to the ballbearings 3 and from there to the bearing bush 13 via the shoulder 34. Owing to the one-piece design of the bearing support arrangement 10, the axial forces 36 are transmitted in a completely wear-free way to the bearing housing 2 via the gimbal ring 12, the webs 16, 17 and the outer flange 11. In this arrangement, the gimbal ring 12 is designed to be as axially stiff as possible, i.e. with an adequate length 37, so that it absorbs the axial forces 36 of the exhaust gas turbocharger which occur during operation, without appreciable deformations. Basically, it is the case that as the length 37 of the outer flange 11, of the gimbal ring 12 and of the first bush part 26 of the bearing bush 13 increases, increasing axial stiffness of the bearing support arrangement 10 is achieved, thus permitting greater axial forces 36 to be absorbed. The radial forces 38 and misaligned positions of the shaft 1 which occur are absorbed in a way analogous to that of the axial forces 36.

In this case, just the four webs 16, 17 which are offset by 90° in each case make adequate radial compliance of the gimbal ring 12 possible. With regard to misaligned positions, the gimbal ring 12 is designed to be as soft as possible, i.e. relatively thin in the radial direction. This permits it to compensate within itself the different angular positions of the shaft 1 by means of elastic twisting and bending. In addition, the gimbal ring 12 has a precisely defined, linear, radial spring stiffness, so that the desired spring/damper characteristic of the bearing arrangement is achieved. When a gimbal ring 12 which is thickened in the region of the webs 16, 17 is used, the stresses which occur in this region are reduced better than is possible with a gimbal ring 12 of constant thickness.

The trapped oil damper 25 is supplied with oil, for example from the internal combustion engine connected to the exhaust gas turbocharger, via an oil pump (not illustrated), the connection 28 for oil under pressure, the connecting hole 29 and the annular passage 30. In the latter, the oil is distributed uniformly over the circumference, so that the annular gap 25 is adequately supplied with oil under pressure. If the annular gap 25 is sealed on both sides with piston rings 32, the oil consumption necessary for damping can be kept relatively low, the cooling effect being comparatively small. In contrast, an annular gap 25 which is sealed on only one side requires an oil consumption which is increased up to ten times but results in an improved cooling effect. The trapped oil damper 25 and the ballbearings 3 are supplied with oil separately. Of course, the supply of oil to the trapped oil damper 25 can also be combined with a conventional self-lubricating or external lubricating arrangement (not illustrated) of the ballbearings 3.

Figure 4:
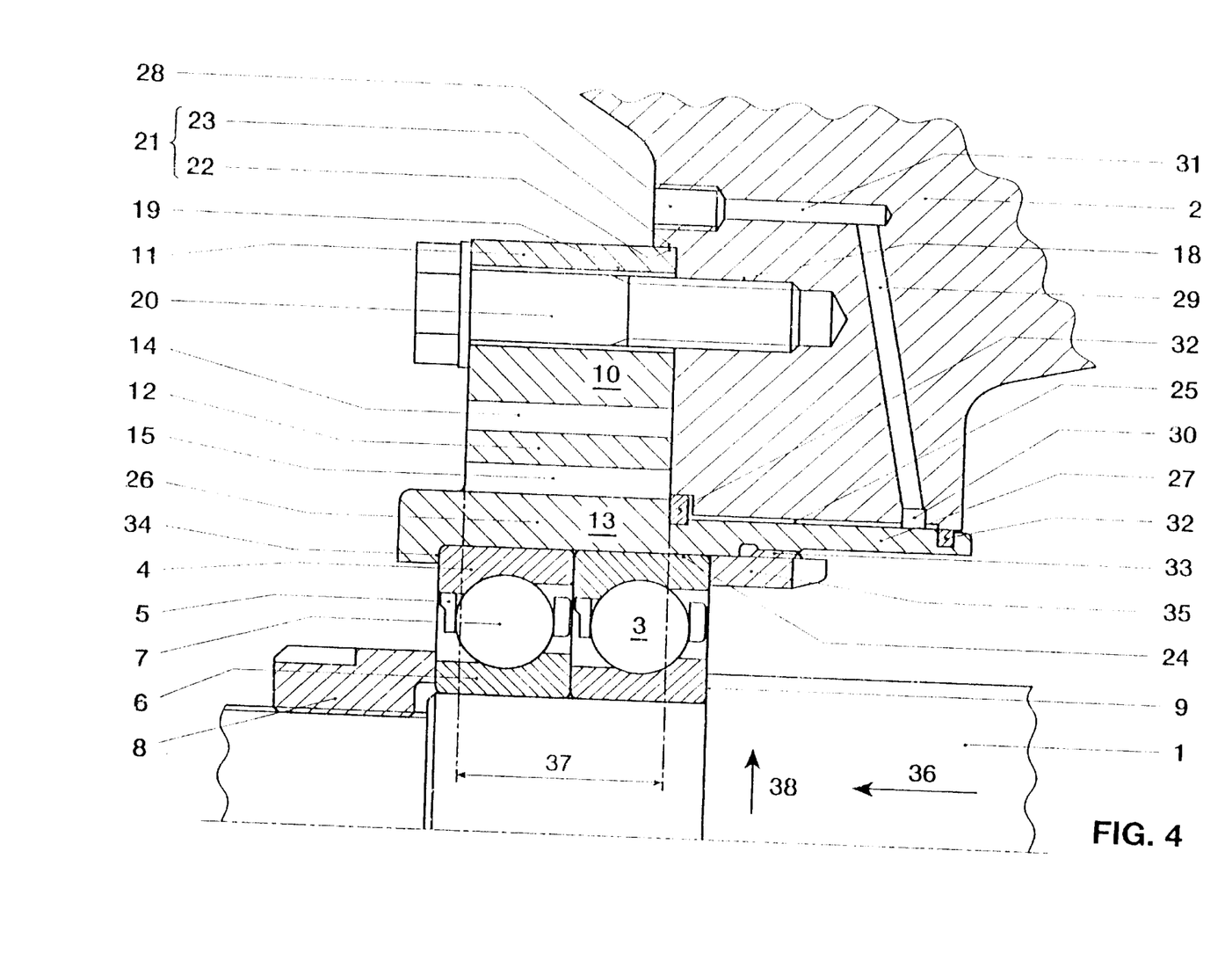
FIG. 4 shows an illustration corresponding to FIG. 1, but in a second embodiment.

In a second exemplary embodiment of the invention, the bearings 3 are arranged axially offset with respect to the first exemplary embodiment in such a way that they are placed directly underneath the gimbal ring 12. This provides a further possible way of assembling the device which can be used given appropriate conditions.

Obviously, numerous modifications and variations of the present invention are possible in the light of the above teachings. It is therefore to be understood that within the scope of the appended claims, the invention may be practiced otherwise than as specifically described herein.

LIST OF DESIGNATIONS

1 Shaft
2 Housing, bearing housing
3 Bearing, axial/radial bearing, ballbearing
4 Outer ring
5 Cage
6 Inner ring
7 Ball
8 Nut
9 Shaft collar
10 Bearing support
11 Outer flange, of 10
12 Gimbal ring, of 10
13 Bearing bush, of 10
14 Circumferential slot
15 Circumferential slot
16 Web, inner
17 Web, outer
18 Hole, threaded hole, of 2
19 Hole, attachment hole, of 11
20 Screw
21 Fit, cylindrical
22 Centering surface, of 11
23 Centering surface, of 2
24 Outer surface, of 3
25 Trapped oil damper, annular gap
26 Bush part, first
27 Bush part, second
28 Connection for oil under pressure
29 Connecting hole
30 Annular passage
31 Oil supply arrangement
32 Piston ring
33 Internal thread, of 27
34 Shoulder, of 26
35 Nut, of 27
36 Axial force
37 Length, of 12
38 Radial force

What is claimed as new and desired to be secured by: Letters Patent of the United States is:

1. A bearing support for rapidly rotating rotors, in particular for the bearing arrangement of turbocharger shafts, which is disposed in a housing (2) and radially supports at least one bearing (3) with respect to the housing (2), an annular gap (25) which is connected to an oil supply arrangement (31) and is used as a trapped oil damper being formed between said housing (2) and the bearing support arrangement (10), wherein a) the bearing support arrangement (10) is of one-piece design, b) the bearing support arrangement (10) comprises an outer flange (11) connected to the housing (2), a gimbal ring (12) and an inner bearing bush (13) which receives the bearing or bearings (3), c) in each case a circumferential slot (14, 15) is formed both between the gimbal ring (12) and the outer flange (11) and between the gimbal ring (12) and the bearing bush (13), d) the gimbal ring (12) is respectively connected to the bearing bush (13) and to the outer flange (11) via two inner and two outer webs (16, 17) which interrupt the respective circumferential slot (14, 15), e) the annular gap (25) is formed between the bearing bush (13) and the housing (2) and is arranged axially offset with respect to the gimbal ring (12), f) in each case at least one centering surface (22, 23) is arranged both on the outer flange (11) and on the housing (2), said centering surfaces (22, 23) being arranged so as to correspond to one another and so as to be concentric with respect to the bearing/bearings (3).

2. The bearing support arrangement as claimed in claim 1, wherein the inner webs (16) are arranged offset with respect to one another by 180°, and the outer webs (17) are arranged offset by in each case 90° with respect to the inner webs (16).

3. The bearing support arrangement as claimed in claim 1, wherein the bearing bush (13) comprises a first bush part (26), which is respectively connected to the gimbal ring (12) and to the outer flange (11), and a second bush part (27) which extends axially with respect to said first bush part (26), the annular gap (25) being formed between the second bush part (27) and the housing (2).

4. The bearing arrangement as claimed in claim 3, wherein the gimbal ring (12) is designed with a constant thickness over its entire circumference.

5. The bearing support arrangement as claimed in claim 4, wherein the bearing/bearings (3) is/are arranged radially underneath the gimbal ring (12).

6. The bearing support arrangement as claimed in claim 4, wherein the bearing/bearings (3) is/are arranged radially underneath the trapped oil damper (25).

7. The bearing support arrangement as claimed in claim 3, wherein the gimbal ring (12) is of radially thickened design in the region of the webs (16, 17).

8. The bearing support arrangement as claimed in claim 1, wherein the oil supply arrangement (31) for the annular gap (25) is arranged in the housing (2) and comprises a connection (28) for oil under pressure, a connecting hole (29) and an annular passage (30).

9. The bearing support arrangement as claimed in claim 1, wherein the oil supply arrangement (31) for the annular gap (25) comprises a connection (28) for oil under pressure, a connecting hole (29) and an annular passage (30), the connection (28) for oil under pressure being arranged in the outer flange (11) and the connecting hole (29) and the annular passage (30) being arranged in the housing (2).

10. The bearing support arrangement as claimed in one of claims 1 to 9, wherein the outer flange (11) is connected to the housing (2) in an easily detachable way.

* * * * *

UNITED STATES PATENT AND TRADEMARK OFFICE
CERTIFICATE OF CORRECTION

PATENT NO. : 5,803,612
DATED : September 8, 1998
INVENTOR(S) : Josef Bättig

It is certified that error appears in the above-indentified patent and that said Letters Patent is hereby corrected as shown below:

Column 6, line 58, delete "in par-".

Column 6, line 59, delete "ticular for the bearing arrangement of turbocharger shafts,".

Column 6, line 60, delete "(2)".

Column 6, line 61, delete "(3)" and delete "(2)".

Column 6, line 62, delete "(25)".

Column 6, line 63, delete "(31)".

Column 6, line 64, delete "(2)".

Column 6, line 65, delete "(10)".

Column 6, line 66, delete "(10)".

Column 7, line 1, delete "(10)".

Column 7, line 2, delete "(11)" and delete "(2)".

Column 7, line 3, delete "(12)" and delete "(13)".

Column 7, line 4, delete "(3)".

Column 7, line 5, delete "(14, 15)".

Column 7, line 6, delete "(12)".
Column 7, line 7, delete "(11)" and delete "(12)".
Column 7, line 8, delete "(13)".

UNITED STATES PATENT AND TRADEMARK OFFICE
CERTIFICATE OF CORRECTION

PATENT NO. : 5,803,612  
DATED : September 8, 1998  
INVENTOR(S) : Josef Bättig

Page 2 of 4

It is certified that error appears in the above-indentified patent and that said Letters Patent is hereby corrected as shown below:

Column 7, line 9, delete "(12)".

Column 7, line 10, delete "(13)" and delete "(11)".

Column 7, line 11, delete "(16, 17)".

Column 7, line 12, delete "(14, 15)".

Column 7, line 13, delete "(25)".

Column 7, line 14, delete "(13)" and delete "(2)".

Column 7, line 15, delete "(12)".

Column 7, line 16, delete "(22, 23)".

Column 7, line 17, delete "(11)".

Column 7, line 18, delete "(2)", delete "surfaces (22, 23)", and insert -- surface -- after "centering".

Column 7, line 20, delete "/bearings".

Column 7, line 21, delete "(3)".

Column 7, line 23, delete "(16)".

Column 7, line 24, delete "(17)".

Column 7, line 25, delete "(16)".

Column 7, line 27, delete "(13)".

UNITED STATES PATENT AND TRADEMARK OFFICE
CERTIFICATE OF CORRECTION

PATENT NO. : 5,803,612
DATED : September 8, 1998
INVENTOR(S) : Josef Bättig

It is certified that error appears in the above-indentified patent and that said Letters Patent is hereby corrected as shown below:

Column 7, line 28, delete "(26)" and delete "(12)".

Column 7, line 29, delete "(11)" and delete "(27)".

Column 8, line 1, delete "(26)" and delete "(25)".

Column 8, line 2, delete "(27)" and delete "(2)".

Column 8, line 4, delete "(12)".

Column 8, line 7, delete "/bearings (3)" and delete "/are".

Column 8, line 8, delete "(12)".

Column 8, line 10, delete "/bearings (3)" and delete "/are".

Column 8, line 11, delete "(25)".

Column 8, line 13, delete "(12)".

Column 8, line 14, delete "(16, 17)".

Column 8, line 16, delete "(31)".

Column 8, line 17, delete "(25)" and delete "(2)".

Column 8, line 18, delete "(28)" and delete "(29)".

Column 8, line 19, delete "(30)".

Column 8, line 21, delete "(31)".

UNITED STATES PATENT AND TRADEMARK OFFICE
CERTIFICATE OF CORRECTION

PATENT NO. : 5,803,612
DATED : September 8, 1998
INVENTOR(S) : Josef Bättig

It is certified that error appears in the above-identified patent and that said Letters Patent is hereby corrected as shown below:

Column 8, line 22, delete "(25)" and delete "(28)".

Column 8, line 23, delete "(29)" and delete "(30)".

Column 8, line 24, delete "(28)".

Column 8, line 25, delete "(11)" and delete "(29)".

Column 8, line 26, delete "(30)" and delete "(2)".

Column 8, line 27, delete "one of" and insert -- claim 1 -- after "in".

Column 8, line 28, delete "claims 1 to 9" and delete "(11)".

Column 8, line 29, delete "(2)".

Column 8, line 30, insert -- 11. The bearing support arrangement as claimed in claim 1, wherein said bearing support for rapidly rotating rotors comprises a bearing arrangement of a turbocharger shaft. --

Signed and Sealed this

Thirteenth Day of July, 1999

Attest:

Q. TODD DICKINSON

Attesting Officer

Acting Commissioner of Patents and Trademarks